April 14, 1970   H. W. DEMLER, SR., ET AL   3,506,029
MANIFOLD SECTIONS TO CONSTRUCT A MANIFOLD
Original Filed June 23, 1965                    3 Sheets-Sheet 1
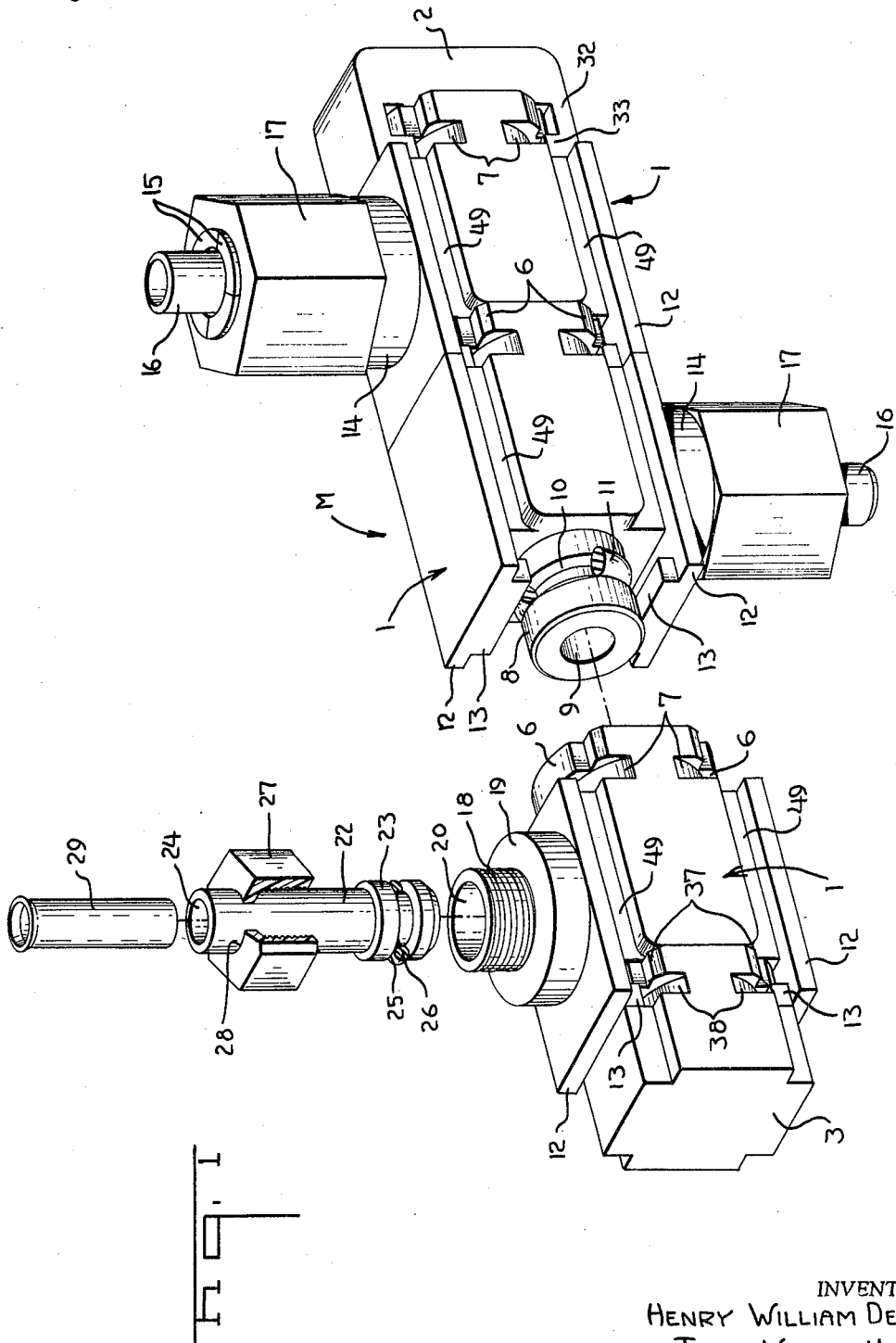
INVENTOR.
HENRY WILLIAM DEMLER SR.
BY JOSEPH WILLARD HOFFMAN
Curtis, Morris & Safford

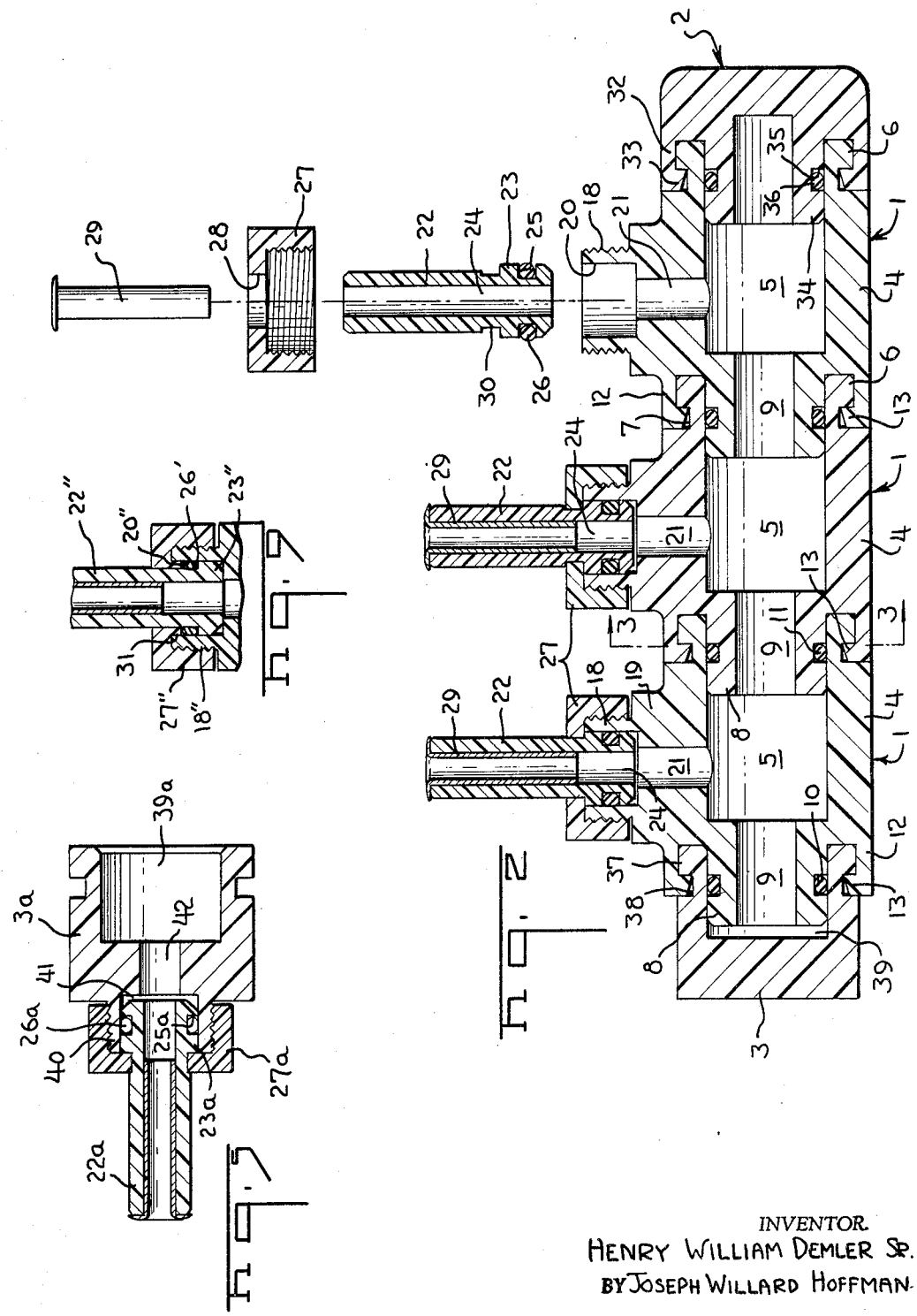

April 14, 1970    H. W. DEMLER, SR., ET AL    3,506,029
MANIFOLD SECTIONS TO CONSTRUCT A MANIFOLD
Original Filed June 23, 1965            3 Sheets-Sheet 3
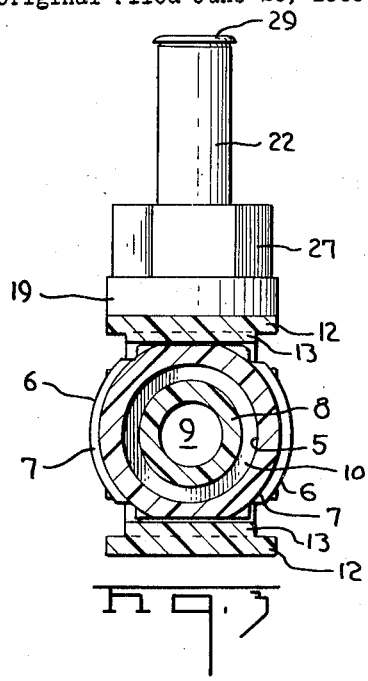
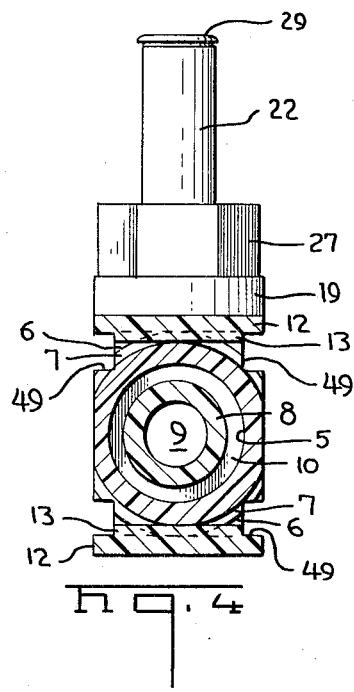
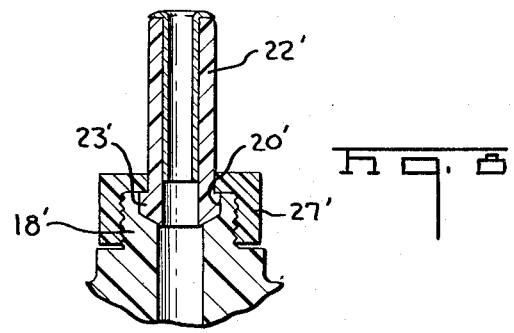
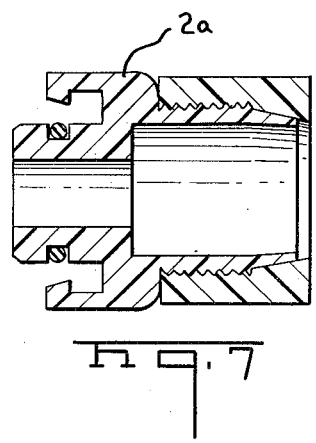
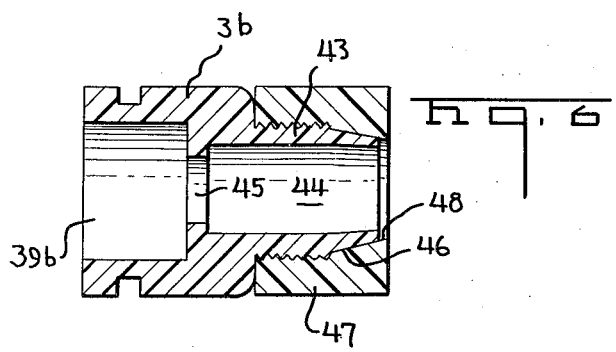
INVENTOR.
HENRY WILLIAM DEMLER SR.
BY JOSEPH WILLARD HOFFMAN
Curtis, Morris & Safford

United States Patent Office 3,506,029
Patented Apr. 14, 1970

3,506,029
MANIFOLD SECTIONS TO CONSTRUCT A MANIFOLD
Henry William Demler, Sr., Lebanon, and Joseph Willard Hoffman, Liverpool, Pa., assignors to AMP Incorporated, Harrisburg, Pa.
Continuation of application Ser. No. 466,337, June 23, 1965. This application June 28, 1968, Ser. No. 751,652
Int. Cl. F15b 1/00; A63h 33/08; F16l 41/00
U.S. Cl. 137—561                                    11 Claims

ABSTRACT OF THE DISCLOSURE

A manifold for use with fluid-carrying lines comprises manifold sections each including latch means on each end to maintain the manifold sections together to form a manifold of a desired length, sealing means between each of the manifold sections to provide a fluid-tight seal therebetween, cap means on the outermost ends of in manifold sections, means on one of these manifold sections to connect the manifold sections to a source of fluid supply, and means on the remainder of the manifold sections to connect the manifold sections to fluid-carrying lines.

---

This application is a continuation of application Ser. No. 466,337, filed June 23, 1965 and now abandoned.

This invention relates to a manifold and more particularly to a manifold for use in conjunction with fluid-carrying lines.

An object of the invention is to provide a manifold that may be increased in length.

Another object of the invention is to provide a manifold that may be decreased in length.

A further object of the invention is to provide a manifold that permits connection to a line in more than one direction.

An additional object of the invention is the provision of manifold sections that are readily assembled to form a manifold of any desired length.

A still further object of the invention is the provision of manifold sections that are readily assembled to form a manifold of any desired length and to provide outlets therefrom in more than one direction.

Still an additional object of the invention is to provide a manifold having means to readily mount the manifold.

Still another object of the invention is to provide a manifold that receives either tubing or various types of coupling members or valves.

A further object of the invention is the provision of a manifold wherein sections of the manifold can be replaced thereby precluding replacement of the manifold.

Other objects and attainments of the present invention will become apparent to those skilled in the art upon a reading of the following detailed description when taken in conjunction with the drawings in which there is shown and described illustrative embodiments of the invention; it is to be understood, however, that these embodiments are not intended to be exhaustive nor limiting of the invention but are given for purposes of illustration in order that others skilled in the art may fully understand the invention and the principles thereof and the manner of applying it in practical use so that they may modify it in various forms, each as may be best suited to the conditions of a particular use.

The foregoing objects of the present invention are achieved by means of manifold sections carrying means to be connected to fluid-carrying means, means to latch the sections together, sealing means on the sections to provide a fluid seal therebetween, cap members to seal the ends of the manifold, means provided in one of the cap members to provide a source of supply, and means on the sections to receive a mounting means.

In the drawings:

FIGURE 1 is an exploded perspective view of the manifold sections and parts thereof;

FIGURE 2 is a longitudinal cross-sectional view of a manifold and parts exploded therefrom;

FIGURE 3 is a view taken along lines 3—3 illustrating two manifold sections prior to being moved to a latched position;

FIGURE 4 is a view similar to that of FIGURE 3 by showing the manifold sections in a latched position;

FIGURE 5 is a cross-sectional view of a female manifold inlet;

FIGURE 6 is a cross-sectional view of an alternative embodiment of a female manifold inlet;

FIGURE 7 is a cross-sectional view of a male manifold inlet;

FIGURE 8 is a partial cross-sectional view of an embodiment of an outlet of a manifold section; and FIGURE 9 is a partial cross-sectional view of another embodiment of an outlet of a manifold section.

Turning now to the drawings, there is illustrated a manifold M including manifold sections 1, male and cap 2 and female end cap 3. Each manifold section 1 includes a body section 4 having an internal cavity 5 extending from one end to a position beyond the center of the manifold section. Semi-circular lips or ears 6 extend outwardly from the end of body section 4 in which cavity 5 begins. Diametrical recesses 7 are disposed in body section 4 adjacent lips 6. A circular extension 8 extends outwardly from the other end of body section 4 and has an opening 9 extending therethrough in communication with internal cavity 5. An annular groove 10 is disposed in the exterior surface of extension 8 and has an O-ring 11 of rubber or plastic material disposed therein.

Stiff leg members or elements 12 extend outwardly from the ends of body section 4 in a direction parallel with respect to extension 8. The free ends of leg members 12 include inturned ends, ear or projections 13 which are directed toward circular extension 8. As can be discerned, the bottom surfaces of ends 13 are slightly tapered.

The two manifold sections to the right in FIGURE 1 have quick disconnect 14 of the type illustrated in U.S. Patent application Ser. No. 427,010, filed Jan. 21, 1965, now abandoned. Segmented sections 15 and tubular sections 16 are integrally connected to the body sections and tubular section 16 communicates with internal cavities 5. Nut members 17 are threadably mounted on threaded portions of quick disconnect 14 so that segmented sections 15 can receive an end of a rubber or plastic tubing therein or an end of a connection member of the type disclosed in the above-mentioned application.

The manifold section to the left in FIGURE 1 and the manifold sections in FIGURE 2 illustrate another type of connection section to receive connection members of the type disclosed in the above-mentioned application that are crimpable thereon. This type of connection section includes threaded section 18 extending outwardly from an annular section 19. A bore 20 is disposed in threaded section 18 and a passage 21 extends between bore 20 and internal cavity 5. A tubular connection member 22 has a section 23 matable with bore 20 and a bore 24 communicable with passage 21. An annular recess 25 is disposed in section 23 and O-ring 26 is disposed therein for sealing purposes. A nut member 27 has an opening 28 extending therethrough. Nut member 27 is threadably mounted on threaded section 18 and tubular connection member 22 extends through opening 28 and the top of nut member 27 engages the upper surface of section 23 so as to secure tubular connection member 22 in position on the manifold section. An insert 29 is disposed within bore 24 of tubular connection member 22 in order to provide a backup member to allow a connection member to be effectively and sealingly crimped thereon.

In order to maintain tubular connection member 22 and nut member 27 together as a unit, a circumferential recess 30 is disposed in tubular connection member 22 adjacent section 23 as illustrated in FIGURE 2 so that the annular surface of opening 28 can be secured therein. Thus, with tubular connection member 22 and nut member 27 secured together as a unit, it would be easier to apply this unit to a manifold section and the incidence of losing at least one of these members would be substantially lessened. With nut member 27 captured in recess 30 of tubular connection member 22, nut member 27 will still be rotatable relative to tubular connection member 22. Insert 29 will snugly be disposed within bore 24 so that the insert will be maintained within bore 24 by frictional engagement therebetween.

An alternative connection section is illustrated in FIGURE 8. In this connection section, section 23′ of tubular connection member 22′ has no annular recess and O-ring disposed therein but instead has the bottom surface beveled which mates with a similar bottom beveled surface of bore 20′. Thus, in this connection section, no O-ring is necessary in order to provide a seal because the mating beveled surfaces provide the sealing arrangement therebetween, but nut member 27′ has to be threaded into tight engagement onto threaded section 18′ in order to make sure that the beveled surfaces are in tight engagement. Otherwise, the connection section is the same as that illustrated in the left side of FIGURE 1 and FIGURE 2.

FIGURE 9 illustrates a further alternative connection member with section 23″ being a single annular flange at the end of tubular connection member 22″. With section 23″ disposed within bore 20″, O-ring 26′ is disposed within bore 20″ on top of section 23″ and nut member 27″ has an inwardly directed annular lip 31 disposed between bore 20″ and tubular connection member 22″ and in engagement with O-ring 26′ when nut member 27″ is threadably engaged on threaded section 18″. Thus, the embodiment of FIGURE 9 defines an adjustable O-ring groove, i.e. an O-ring groove that will adjust itself in accordance to the pressure. If desired, a C-shaped snap ring can be disposed on tubular connection member 22″ at a position adjacent nut member 27″, and this snap ring would snugly engage the exterior surface of tubular connection member 22″ in order to maintain nut member 27″, O-ring 26′ and tubular connection member 22″ as a unitary structure.

Male end cap 2 comprises stiff leg members 32, inturned ends 33, a circular extension 34 having an annular groove 35 and an O-ring 36 disposed in annular groove 35. The configuration of male and cap 2 is similar in construction to the part of body section 4 having stiff leg members 12, inturned ends 13, circular extension 8, annular groove 10 and O-ring 11.

Female end cap 3 comprises semi-circular lips 37, diametrical recesses 38 and a cavity 39 which is similar in construction to the part of body section 4 including semi-circular lips 6, diametrical recesses 7 and internal cavity 5.

In assembly, the end of a manifold section containing lips 6 and recesses 7 is disposed in alignment with the end of another manifold section containing circular extension 8 and leg members 12. The manifold sections are turned 90° with respect to each other and the manifold sections are moved into engagement with each other so that circular extension 8 is disposed within internal cavity 5 and inturned ends 13 are in alginment with diametrical recesses 7 as illustrated in FIGURE 3. The manifold sections are then rotated 90° with respect to each other so that inturned ends 13 are disposed within diametrical recesses 7 and the connection members or quick disconnects 14 are disposed within the same plane as illustrated in FIGURES 1, 2 and 4. Thus, the manifold sections are removably secured together and O-ring 11 provides a sealed connection therebetween. Other manifold sections are connected to the connected manifold sections to form a manifold of any desired length with each manifold section having a quick disconnect 14 in order to secure the end of a rubber or plastic tubing or one end of a connection member or a connection section of the type illustrated in FIGURES 2, 8 and 9 so that a connection member can be crimped onto the tubular connection member.

End caps 2 and 3 are secured to respective ends of the formed manifold in order to seal the ends thereof via O-rings 10 and 36. Of course, if it is desired to decrease the length of the manifold by eliminating fluid-carrying lines, manifold sections are removed from the manifold and the remainder of the manifold sections are secured together to once again form the manifold. If it is desired or necessary that some of the fluid-carrying lines are to extend in a direction 180° from the other fluid-carrying lines, the quick disconnect or connection sections of the manifold section onto which these fluid-carrying lines are to be connected will be disposed in a direction 180° from that of the other quick disconnect or connection sections of the other manifold sections. Other angular dispositions of manifold sections with respect to one another other than 180° apart can of course be realized in the event that other angular dispositions are necessary.

While the manifold illustrated in FIGURE 2 has end caps 2 and 3 secured to respective ends thereof and the source of fluid supply would be connected to one of tubular connection member 22 on one of the manifold sections, female end cap 3 can be replaced by female end cap 3a illustrated in FIGURE 5 in order to provide a source of fluid supply. Female end cap 3a includes a threaded section 40 having a bore 41 therein. A passage 42 extends between bore 41 and cavity 39a. Tubular connection member 22a has section 23a provided with annular recess 25a having O-ring 26a. Section 23a is disposed in bore 41 and nut member 27a is threadably mounted on threaded section 40 so as to secure tubular connection member 22a therein. Thus, a connection member connected to a source of fluid supply can be crimped onto tubular connection member 22a and female end cap 3a is secured on the end of the manifold in place of female end cap 3 so as to provide a source of fluid supply to the manifold through one end thereof. Of course, the tubular connection members of FIGURES 8 and 9 can be used in place of tubular connection member 22a, if desired.

FIGURE 6 illustrates an alternative female end cap 3b to which a source of fluid supply can be connected. The female end cap of this embodiment includes a threaded section 43 having a bore 44 disposed therein. Passage 45, which is of smaller diameter than bore 44, extends between cavity 39b and bore 44. A beveled surface 46 is located on the outer section of threaded section 43. A nut member 47 is threadably mounted on threaded section 43 and includes a beveled surface 48 matable with beveled surface 46; however, beveled surface 48 has an angular disposition which is less than that of beveled surface 46 so that when nut member 47 is tightened onto threaded section 43, beveled surface 48 in mating relationship with beveled surface 46 causes the outer portion of threaded section 43 carrying beveled section 46 to be moved inwardly into a tight and sealed engagement with a tubular member carrying a source of fluid supply when it is disposed within bore 44.

FIGURE 7 illustrates a male end cap 2a having an arrangement similar to that of FIGURE 6 so as to allow a source of fluid supply to be connected to the male end cap instead to the female end cap; however, a source of fluid supply can be connected to either embodiment of FIGURES 6 and 7 and the other end cap can be connected to another end cap of another manifold in order to provide interconnection between manifolds and using the same source of supply. It will be discerned, that with the embodiments of FIGURES 6 and 7, a larger tubular member than that connected to the connection members of the manifold sections is disposed within bores 44 so that more volume input can be supplied to the manifold in order to provide a more balanced output. The tubular connection member of the embodiment of FIGURE 5 is the same size as that of tubular connection members 22. If desired, threaded sections 43 of the embodiments of FIGURES 6 and 7 can be a straight tubular section so that one end of a connection member can be crimped thereon, and if necessary, an insert can be disposed therein so as to provide a backup member.

Manifold sections are preferably molded from a suitable plastic material but can be made from any desirable material. Leg members 12 and 32 may be sufficiently flexible so that the manifold sections can be pushed together instead of being rotated relative to one another and the male end cap can be pushed into position. Recesses 49 are disposed in the sides of the manifold sections in order to receive inturned ends of a channel member (not shown) to provide a mounting means for the manifold. Alternatively, inwardly directed flanges on opposing panel members can be accommodated within opposing recesses 49 in order to mount the manifold.

As can be discerned, there has been disclosed a unique manifold comprising manifold sections that are removably secured together in order to increase or decrease the size of the manifold at will.

It will, therefore, be appreciated that the aforementioned and other desirable objects have been achieved; however, it should be emphasized that the particular embodiments of the invention, which are shown and described herein, are intended as merely illustrative and not as restrictive of the invention.

What is claimed is:

1. In a manifold having manifold sections to form said manifold of any desirable length, each of said manifold sections comprising a body section having an internal cavity extending from one end to beyond a center thereof, diametrical recesses on said one end exterior of said cavity, an extension having sealing means thereon extending outwardly from another end of said body section, and leg means having inturned ends extending outwardly from said other end in a direction parallel with respect to said extension, said extension being disposed in said internal cavity of an adjacent manifold section in sealing engagement therewith and said inturned ends being disposed in said diametrical recesses of said adjacent manifold section to latch adjacent manifold sections together.

2. In a manifold according to claim 1 wherein each manifold section includes means to connect a fluid supply line thereto, and means on one of said manifold sections to connect a source of fluid supply thereto.

3. In a manifold according to claim 1 wherein end cap means are latchingly disposed on ends of said manifold.

4. A manifold section to form a manifold of any desirable length comprising a body section having a cavity extending from one end toward another end, recess means at said one end, an extension extending outwardly from said other end and having an opening in communication with said cavity, leg means extending outwardly from said other end in the same direction as said extension but spaced outwardly therefrom and having inturned end means, said extension mateable with the cavity of an adjacent complementary manifold section and said inturned end means mateable with the recess means at the one end of said complementary manifold section to secure said manifold sections together, and sealing means provided by said extension and the cavity in which it is mateable to form a sealed connection therebetween.

5. A manifold section according to claim 4 wherein connection means extend outwardly from said body section to connect fluid line means thereto.

6. A manifold section according to claim 4 wherein said manifold section is made of plastic material.

7. A manifold for supplying a fluid to fluid lines comprising a main conduit, said conduit including a plurality of longitudinally arranged sections, each of said sections including a cavity, recess means in one end, a tubular extension and leg means extending outwardly from another end with said leg means engaging the recess means and said extension being disposed in the cavity of adjacent sections to secure the sections together in communication, sealing means between the cavity of each section and the extension therein to provide a fluid tight seal, means on said sections for connecting said sections to fluid lines, and means on said main conduit for connecting same to a source of fluid supply.

8. A manifold according to claim 7 wherein said sections are disposable in different angular dispositions to accommodate the direction the fluid lines extend.

9. A manifold for fluid-carrying lines comprising a plurality of manifold sections with each manifold section having at one end a first tubular extension with outwardly projecting ears and at the other end a second tubular extension and leg members with inwardly projecting ears, the second tubular extension of one manifold section being engageable snugly and sealingly within the first tubular extension of an adjacent manifold section and the ears on the first tubular extension being engageable behind the ears on the leg members on moving the manifold sections axially together and subsequently rotating them about the axis relative to each other, sealing means provided by said second tubular section to provide sealed engagement between said second tubular section and the first tubular extension of the adjacent manifold section, and means on said manifold sections for connection with fluid-carrying lines.

10. In a manifold assembly, a plurality of manifold sections each provided with a cavity, a tubular extension at one end and recesses at another end, integral flexible leg members extending outwardly from each of said manifold sections and along but spaced from said tubular extension, said leg members having inwardly-directed projections, said tubular extension of one manifold section being disposable in said cavity of another manifold section with the inwardly-directed projections of the leg members adjacent said tubular extension of said one manifold section coming to rest in the recesses of the said another manifold section thereby latching the manifold sections together, sealing means between the tubular section of the one manifold section and the cavity of the another manifold section for providing a sealed connection therebetween, cap means provided with a tubular element and flexible leg elements having inwardly-directed elements, said tubular element being sealingly disposable in the cavity of the one manifold section and the inwardly-directed elements coming to rest in the recesses of the one manifold section, further cap means provided with cavity means and recess means, the tubular extension of the another manifold section being sealingly disposable in the cavity means of said further cap means with the inwardly-directed projections of said flexible leg members of the another manifold section comining to rest in the recess means of said further cap means, and means extending outwardly from the manifold sections for connection to fluid-carrying lines.

11. In a manifold assembly according to claim 10 wherein one of said cap means is provided with means for connection to a fluid supply means.

(References on following page)

References Cited

UNITED STATES PATENTS

| | | | |
|---|---|---|---|
| 643,358 | 2/1900 | Konold | 285—360 XR |
| 788,488 | 4/1905 | Miller | 287—103 XR |
| 1,043,683 | 11/1912 | Fieser. | |
| 2,110,158 | 3/1938 | Keeler | 287—103 XR |
| 2,481,404 | 9/1949 | Donner | 285—347 XR |
| 3,117,587 | 1/1964 | Willinger | 137—315 |
| 3,118,578 | 1/1964 | Collins | 215—44 XR |
| 3,384,121 | 5/1968 | Spencer | 137—454.2 XR |
| 3,219,366 | 11/1965 | Franck | 285—190 |
| 3,199,538 | 8/1965 | Anthon | 251—367 XR |

FOREIGN PATENTS 1,119,993  4/1956  France.

HENRY T. KLINKSIEK, Primary Examiner

U.S. Cl. X.R.

46—25; 285—156, 177, 332, 347, 423; 287—104